US006928182B1

(12) United States Patent
Chui

(10) Patent No.: US 6,928,182 B1
(45) Date of Patent: Aug. 9, 2005

(54) IMAGING

(76) Inventor: Kui Ming Chui, 8 Gilbey Close, Ickenham, Uxbridge, Middlesex (GB), UB10 8TD ( * ) Notice: Subject to any disclaimer, the term of this patent is extended or adjusted under 35 U.S.C. 154(b) by 0 days.

(21) Appl. No.: 09/807,396

(22) PCT Filed: Oct. 5, 1999

(86) PCT No.: PCT/GB99/03417

§ 371 (c)(1),
(2), (4) Date: Apr. 12, 2001

(87) PCT Pub. No.: WO00/22573

PCT Pub. Date: Apr. 20, 2000

(30) Foreign Application Priority Data

Oct. 15, 1998 (GB) ............................................. 9822397
Nov. 18, 1998 (GB) ............................................. 9825165
Feb. 2, 1999 (GB) ............................................. 9902332

(51) Int. Cl.$^7$ ................................................. G06K 9/00
(52) U.S. Cl. ....................... 382/131; 382/130; 382/256; 382/263; 382/268; 382/269; 382/275; 382/279; 345/613; 378/4
(58) Field of Search ................................. 382/131, 279, 382/268, 256, 266, 263, 269, 133, 128, 275; 128/922; 345/613; 250/501; 356/39; 377/10; 378/4, 21, 23; 600/425

(56) References Cited

U.S. PATENT DOCUMENTS

| 4,947,323 A | | 8/1990 | Smith |
| 4,973,111 A | | 11/1990 | Haacke et al. |
| 5,001,429 A | | 3/1991 | Constable et al. |
| 5,150,292 A | * | 9/1992 | Hoffmann et al. .......... 600/431 |

(Continued)

FOREIGN PATENT DOCUMENTS

| EP | 0 159 780 A1 | 10/1985 |
| GB | 2 155 187 A | 9/1985 |
| GB | 2 235 779 A | 3/1991 |
| JP | 9062836 | 3/1997 |
| JP | 9153141 | 6/1997 |

OTHER PUBLICATIONS

Alperin, k. R. Hoffman, Automated analysis of coronary lesions from cineangiograms using vessel tracking and iterative deconvolution techniques, 1999, IEEE, p. 153–156.*

Alperin N. et al.: "Automated Analysis of Coronary Lesions from Cineangiograms Using Vessel Tracking and Iterative Deconvolution Techniques" Proceedings of the Computers in Cardiology Meeting, US, Washington, IEEE Comp. Soc. Press, vol. Meeting 16, Oct. 16, 1989 p. 153–156 XO000147033 ISBN: 0–8186–2114–1.

(Continued)

Primary Examiner—Bhavesh M. Mehta
Assistant Examiner—Barry Choobin
(74) Attorney, Agent, or Firm—Davis & Bujold, P.L.L.C.

(57) ABSTRACT

A de-convolution process is applied to an MR, CT or other image (25) of a scanned-object (23) to derive the point-spread function (22') at an object-edge and to pin-point from the mid-point of its full-width-half-maximum FWHM, the location (30) of the true image-edge. With the object-image (25') overlying the PSF function (22') in the de-convolution space, sub-pixels which follow location (30) are transferred to before it to re-construct the image-edge (25') for sharper conformity to the object-edge (23). Sharp definition of image-contour (37) facilitates accurate determination of area and volume of image profiles (35) and their segmentation. The accurate image-edge definition enables viable correction of geometrical distortion in stand-alone MR diagnosis and treatment planning.

16 Claims, 6 Drawing Sheets

U.S. PATENT DOCUMENTS

| | | | |
|---|---|---|---|
| 5,445,155 A | | 8/1995 | Sieben |
| 5,576,548 A | * | 11/1996 | Clarke et al. ............... 250/369 |
| 5,594,767 A | | 1/1997 | Hsieh |
| 5,784,492 A | | 7/1998 | Cohen et al. |
| 5,790,692 A | * | 8/1998 | Price et al. ................. 382/133 |
| 6,166,801 A | * | 12/2000 | Dishon et al. ............... 355/27 |
| 6,603,529 B1 | * | 8/2003 | Finarov ...................... 355/27 |
| 2002/0186874 A1 | * | 12/2002 | Price et al. ................. 382/133 |

OTHER PUBLICATIONS

Charland P. et al.: "The Use of Deconvolution and Total Least Squares in Recovering a Radition Detector Line Spread Function" Medical Physics, US, American Institute of Physics, New York, vol. 25, No. 2, Feb. 1998, p. 152–160 XP000833821, ISSN: 0094–2405.

Marsuki Kisworo et al.: "2–D Edge Feature Extraction to Subpixel Accuracy Using the Generalized Energy Approach" Proceeding of the International Conference on EC3–Energy, Computer, Communication and Control Systems (TENCON), US, New York, IEEE, Aug. 2, 1991, p. 344–348 XP000333363 ISBN: 0–7803–0539–.

* cited by examiner

IMAGING

FIELD OF THE INVENTION

This invention relates to imaging and in particular to methods and systems for image enhancement.

BACKGROUND OF THE INVENTION

Imaging involves transfer from the object domain into the image domain, but owing to limiting factors such as the finite size of energy source, detector size, sampling frequency, display density, software filter function, and possibly partial-volume effects experienced with some imagers, an infinitely fine delta function in the object domain cannot be faithfully reproduced in the image domain. Instead, a smeared-out image, or point-spread function (PSF), is observed. Similarly, an infinitely sharp edge-response function (ERF) in the object domain becomes a smeared-out ERF in the image domain. The smearing effect becomes more intense as the adjacent ERFs of discontinuities or contrast profiles get closer to each other.

It is an object of the present invention to provide a method and system by which the above problem can be at least partly overcome.

SUMMARY OF THE INVENTION

According to one aspect of the present invention there is provided a method wherein a de-convolution process is applied to the image-domain results of an object-scan to derive therefrom the respective point- or line-spread function effective in the object- to image-domain transfer of one or more object-discontinuities, and to derive from said function the location in the image domain of the respective discontinuity.

According to another aspect of the invention there is provided an imaging system comprising means for performing a de-convolution process on the image-domain results of an object-scan to derive therefrom the respective point- or line-spread function effective in the object- to image-domain transfer of one or more object-discontinuities, and means to derive from said function the location in the image domain of the respective discontinuity.

The method and system of the invention enable the location of the respective discontinuity in the image domain, to be established with a high degree of accuracy. This is critical to image definition free of any substantial smearing, and to this end the location of the respective discontinuity may be derived to sub-pixel accuracy simply from the mid-point of the full-width half-maximum of said function.

The said function may be correlated with the image-domain results of said transfer for enhancement of spatial resolution of the imaging of the one or more discontinuities. This enhancement may involve transfer of sub-pixels within the image-domain results of the respective one or more discontinuities, the sub-pixels being transferred within their respective image-domain results from one side to the other of said location.

The de-convolution process may be carried out using least-squares running filtering.

BRIEF DESCRIPTION OF THE DRAWINGS

An imaging method and system according to the present invention will now be described, by way of example, with reference to the accompanying drawings, in which.

DETAILED DESCRIPTION OF THE PREFERRED EMBODIMENTS

The method and system to be described with reference to FIG. 1 utilise MR scanning for medical diagnostic and treatment-planning purposes. In principle and in the general techniques described, the method and system of the invention can be used in other applications of MR scanning and also in circumstances where other scanning techniques are utilised. Furthermore, although both structure and function are represented by discrete 'boxes' 1 to 19 in FIG. 1, the method and system are to a substantial extent manifest in programmed digital data-processing operations.

Figure 1:
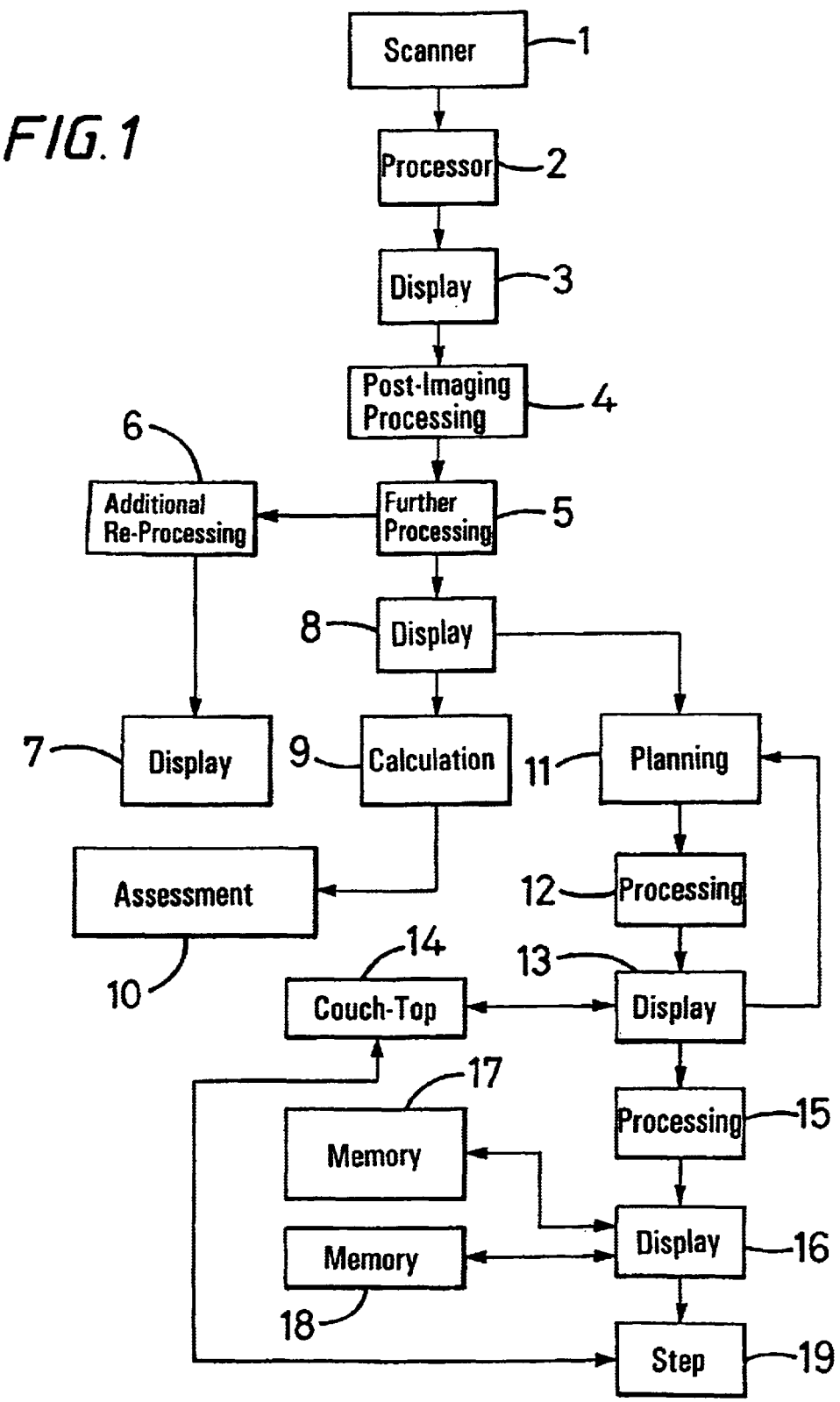
FIG. 1 illustrates schematically the method and system of the invention.

Referring to FIG. 1, data derived in accordance with conventional operation of an MR scanner 1 is processed for imaging purposes within a processor 2. The output of the processor 2 is used to provide a display 3, and from this is subject to post-imaging processing 4. The post-imaging processing 4 includes the facility for selecting a region of the display 3 for more-detailed and closer inspection.

To the extent the imaging method and system of FIG. 1 have so far been described, they are conventional, and it is in further processing 5 of the image data of the selected region of interest obtained by the post-imaging processing 4 that a step forward from what is already known is achieved. More particularly, the further processing 5 is operative to define more clearly the true edges or boundaries of image contour(s) in the selected region of interest, and to enhance the accuracy of the imaging of those contours.

The definition and accuracy of transfer of features from the object domain scanned by the scanner 1, to the image domain manifest in the post-imaging processing 4, is limited by many factors. The limitations arise from within the scanner 1 itself (in particular the finite size of the energy source), within the processing performed by the processor 2, and within the display 3; limitations arise inherently from, for example, the data sampling frequency and display density used, and also from the filter-function of the software involved. More particularly, and referring to FIG. 2, an infinitely fine delta function 20 in the object domain is not faithfully reproduced in the image domain. Instead, the transfer as represented by the arrow 21 results in a point-spread function (PSF) or smeared-out image 22 in the image domain. Similarly, an infinitely sharp edge-response function (ERF) or step 23 in the object domain becomes through the transfer represented by arrow 24, a smeared-out transition 25 of spread represented by dimension arrows 26, in the image domain. When two image ERFs are close to one another, the smeared-out effects run into each other. The consequent deterioration of the spatial resolution is often monitored by the percentage modulation transfer which is given by the ratio, expressed as a percentage, of the amplitude of the modulation in the image domain to that in the object domain.

The smearing effect becomes more intense as adjacent ERFs of discontinuities or contrast profiles get closer to each other (or as the spatial frequency of the modulation becomes higher); this also causes loss of profile height. The inherent loss of the spatial resolution (that is, the part that is indicated by the smeared-out effect on the corner edge of the ERF) cannot be restored or partially restored even by re-scanning the image with an ultra high resolution digital scanner system.

The further processing 5 is operative in accordance with the invention to provide accurate image-edge definition and location, and to improve spatial resolution in the imaging. More especially, in the context of FIG. 2, the edge position corresponding to the discontinuity or step 23 of the object ERF is pin-pointed in the image domain from the mid-point of the full-width half-maximum (FWHM) of the image PSF; the pin-pointing is to sub-pixel accuracy for the image ERF. Low-contrast and 'area' filtering are used to remove 'spurious' edges, and sub-pixel sampling to detect detail to the resolution of the single-pixel modulation. The discontinuity or step 23 of the ERF is then restored within the image domain by removing the sub-pixel values from outside the optimum edge position to compensate for those within. It is to be noted that the sub-pixels then become pixels in display, and that the enhancement is equivalent to the performance of an extra high resolution image transfer system.

Figure 2:
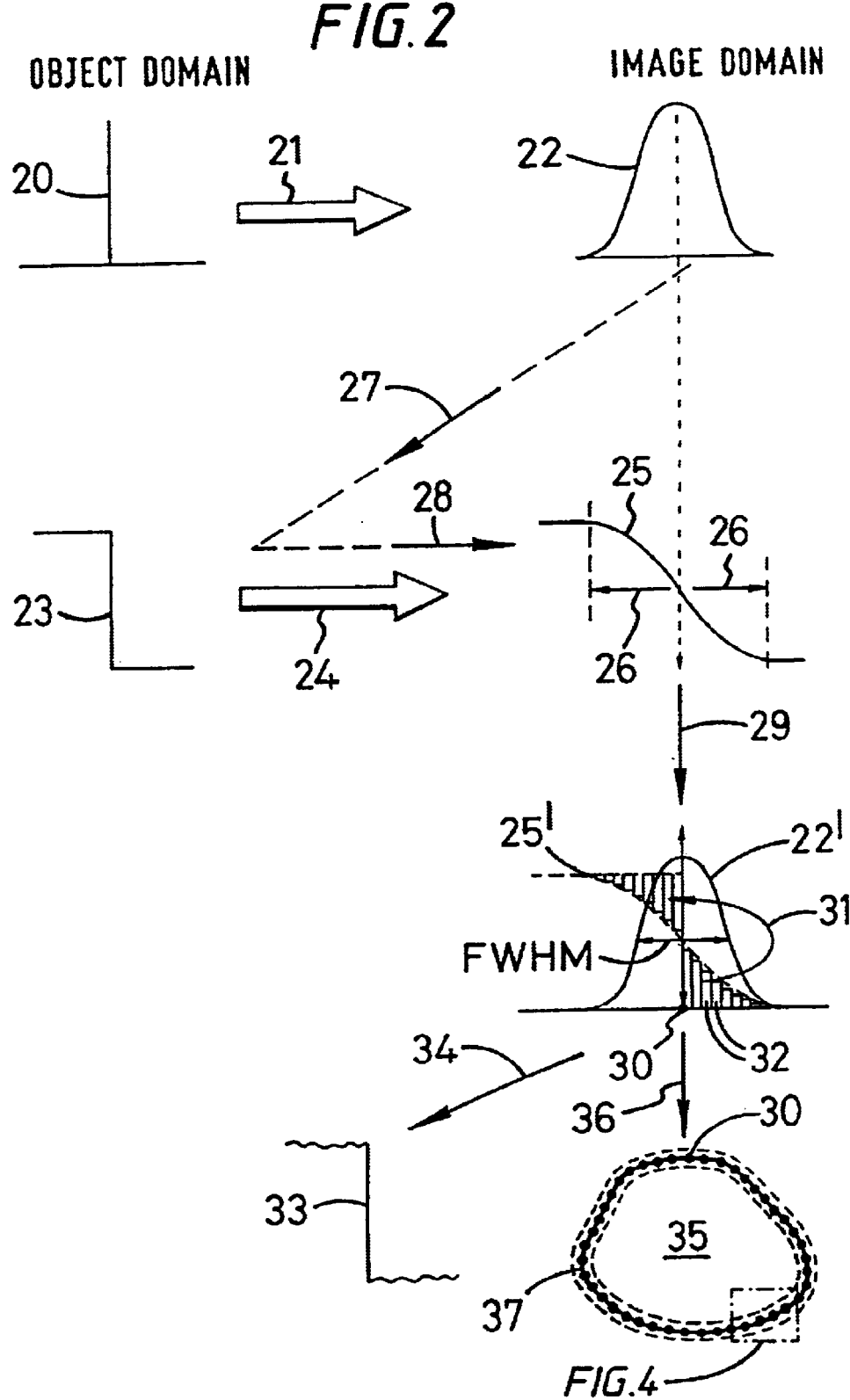
FIG. 2 illustrates features of processing performed in the method and system of FIG. 1.

As represented in FIG. 2 by the arrows 27 and 28, the image ERF 25 of an infinitely-sharp step 23 can be produced by convolution of the image PSF 22 with the object ERF 23. In accordance with the present invention, de-convolution of the image ERF 25 using sub-pixel sampling, represented by the arrow 29, reproduces the image PSF 22 in a de-convolution space as image PSF 22'. The image ERF 25 is superimposed on the PSF 22' within this space as image ERF 25', and the optimum edge-position 30 is derived from the mid-point of the FWHM of the image PSF 22', and is pin-pointed to sub-pixel accuracy.

For one-dimensional cases, the operation in accordance with the invention is relatively simple, as only either the x- or the y-profile, that is to say a line spread function LSF is involved. But for two-dimensional operations, both the x- and y-profiles, and if necessary, the xy-diagonal profiles to eliminate any possible streakings in the image, may be used; in this case, a proper weighting scheme will be required to re-construct the image.

Once the original sharp-edge feature represented by the object ERF 23 is pin-pointed at the position 30 within further processing 5, that feature may be restored by additional re-processing 6 (FIG. 1). In re-processing 6, the sub-pixel values occurring 'outside' the optimum edge-position 30 are transferred to compensate those 'within'. This is illustrated in FIG. 2 by arrow 31 transferring sub-pixel blocks 32 from after point 30 in the image ERF 25', to before it. The re-construction of image ERF 25' into image ERF 33 conforming closely in configuration to object ERF 23 is represented by arrow 34. Image ERF 33 is displayed in enlarged form in display 7 (FIG. 1).

These techniques enable substantial recovery of the loss of spatial resolution in the imaging, without the trade-off loss of other properties such as image noise. Furthermore, the enhancement of spatial resolution in display 7 reproduces the region of interest selected from display 3, without blurring (or step) effects at the profile edge.

Figure 3:
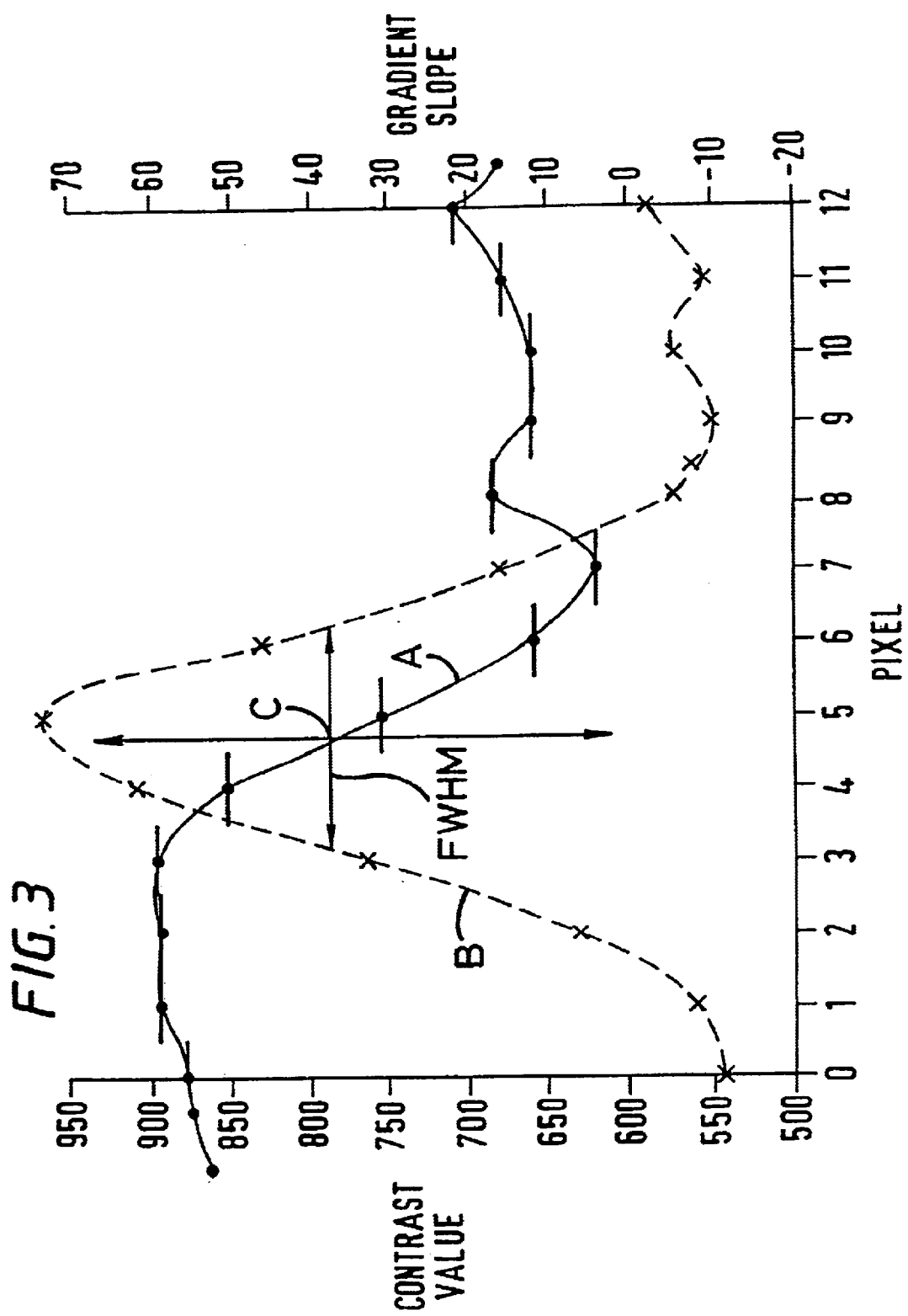
FIG. 3 shows results achieved from use of the method and system of FIG. 1.

FIG. 3 is illustrative of some of the low-contrast results provided in practice from MR scanning of a pig's brain in fluid. Curve A is the image ERF produced, whereas curve B is the line spread function (LSF) resulting from de-convolution of curve A carried out in processing 5. The optimum edge-position is established from the mid-point C of the FWHM of curve B, and the additional re-processing 6 is operative by means of sub-pixel transfer, to re-construct curve A to conform substantially to the edge-feature from which it originated in the display 7.

It is to be noted that whereas curve A is stepped, curve B is nonetheless smooth and that mid-point C is located to sub-pixel accuracy. Furthermore curve B indicates a sensitivity of more than 8:1 between the profile-height and background noise.

Referring again to FIG. 2, the complete profile 35 of an image within the selected area of interest of display 3, is built up as indicated by arrow 36, from the edge-position data derived within processing 5. This data identifies the location of the point 30, together with the locations of all corresponding points derived from sampling the multiple x- or y-profiles of the selected area of interest. The build up and display of these points from the data takes place in display 8 so that a substantially true contour 37 for the profile 35 is defined. The sharpness of the true contour 37 is in contrast to the smeared contour that without de-convolution would have been obtained by virtue of the spread (represented by the arrows 26) of the relevant image ERFs 25.

Figure 4:
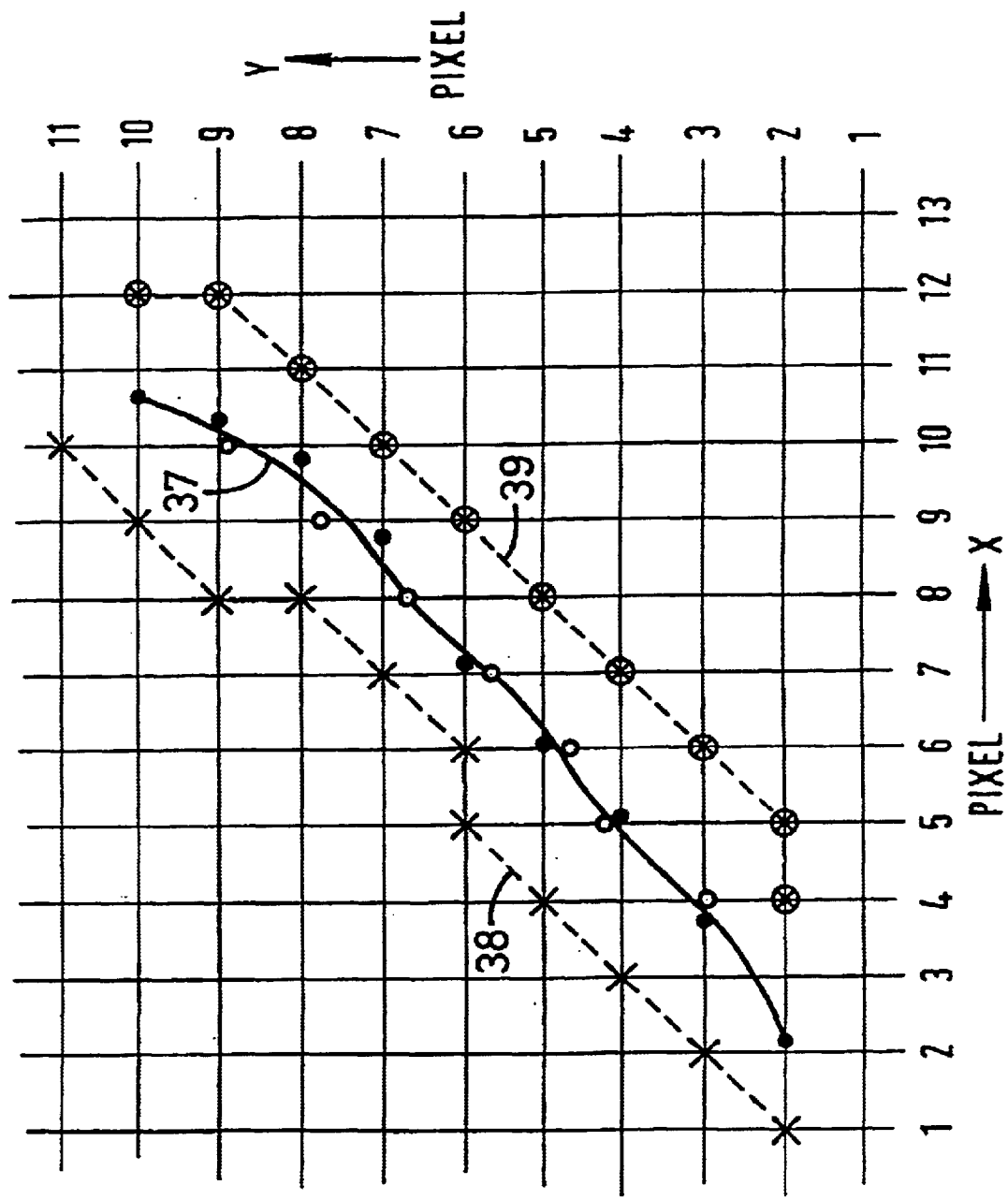
FIG. 4 shows to an enlarged scale a section of the contour of an image profile depicted in FIG. 2.

A small portion of the contour 37 is shown enlarged in FIG. 4 and is defined as a best-fit line between optimum edge-positions derived respectively from x- and y-profiles; the x-profile positions are indicated by black dots and the y-profile positions by white dots. The closeness to one another of corresponding positions in the x- and y-profiles is indicative of the accuracy to sub-pixel level achieved. The smear-out that would have been manifest in the image-profile contour if the de-convolution technique were not used, would have extended throughout the space bounded by the dashed lines 38 and 39; these boundaries are indicated in dashed line in the representation of profile 35 in FIG. 2.

The accurate definition of the image contour 37 derived in the display 8 allows correspondingly accurate determination in calculation 9 of the area within that contour; the volume involved can also be derived from successive slices scanned. The determination of area and volume is especially useful for diagnostic and accurate assessment 10 of the size of a tumour or lesion before and after treatment. It is similarly useful for assessment of arterial dimensions in angiography.

Moreover, the accurate definition of the image contour 37 derived in the display 8, is particularly useful for segmenting anatomical structures for diagnostic and treatment planning 11. Furthermore, the ratio of intensities of two scans are derived by processing 12 to derive values of relaxation times $T_1$, and $T_2$, and of proton density. The values are then represented in display 13 within the boundary of the image contour, utilising standardisation data derived from a couch-top 14 used within the scanner 1. The couch-top 14, which also provides landmarks for determining position coordinates, has the form shown in FIGS. 5 and 6, and will now be described.

Figure 5:
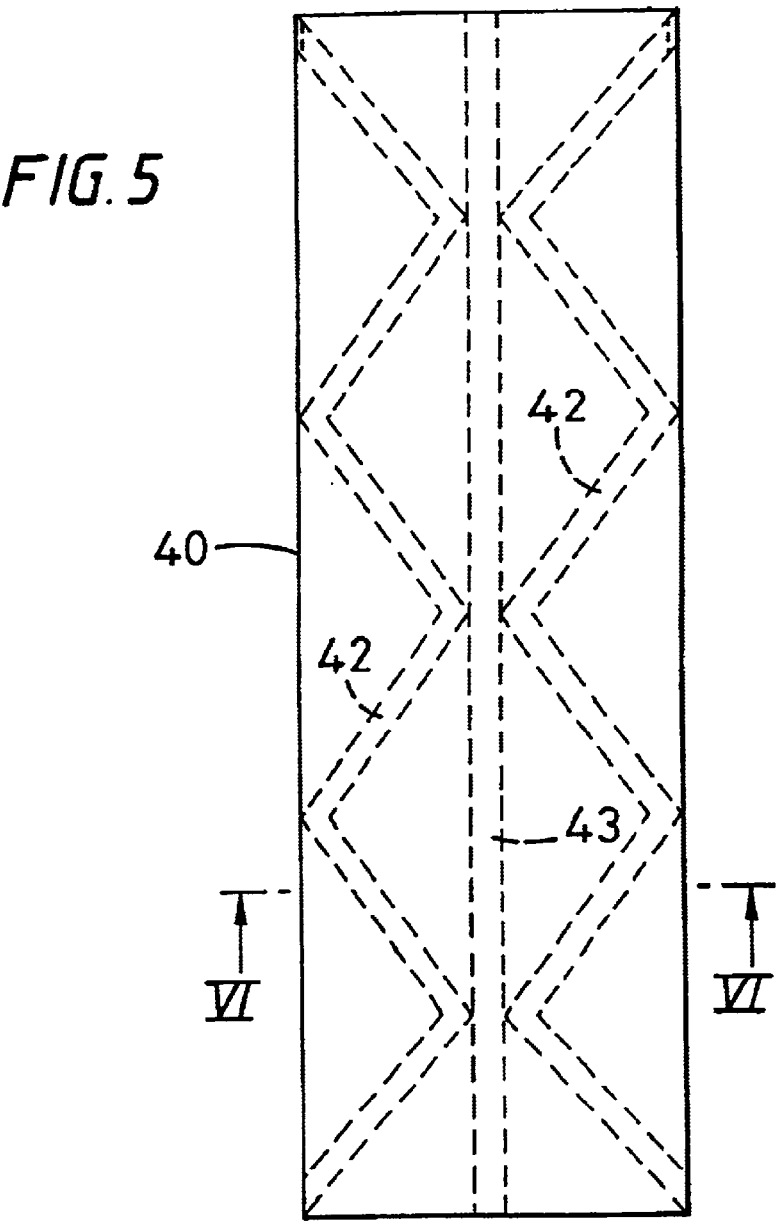
FIGS. 5 and 6 are a plan view and sectional end-elevation elevation of a couch-top used in the method and system of FIG. 1.
Figure 6:
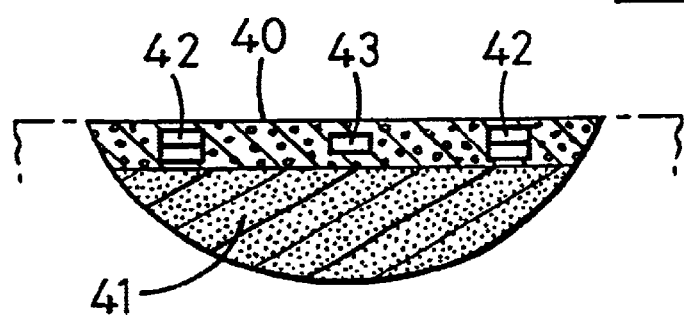

Referring to FIGS. 5 and 6, the couch-top 40, which is of polystyrene bubble foam, has the form of a flat slab, and is supported on a curved foam base 41 that fits to the scanner table of the MR installation. Two zig-zag runs of tubing 42 are embedded within the top 40 to extend along the length of the couch either side of centrally-embedded straight tubing 43.

The tubing 42 of each zig-zag run is of double-bore rectangular cross-section, whereas the tubing 43 is of single-bore cross-section. The five bores defined by the array of tubing 42 and 43 may be filled respectively with the five MR solutions $S_0$ to $S_4$ of Table I, for standardization and calibration purposes. The four $MnCl_2.4H_2O$ solutions, $S_1$ to $S_4$, cover the full range of values of $T_1$, and $T_2$ for anatomical tissues, and the fifth solution, $S_0$, of $CuSO_4.5H_2O$, is nominally equivalent to "loosely bound water".

TABLE I

| Solution | | $T_1$ at 0.5T | $T_2$ at 0.5T |
|---|---|---|---|
| $S_0$ | 1.25 g/l $CuSO_4.5H_2O$ | 200 ms | 200 ms |
| $S_1$ | $3.41 \times 10^{16}$ $Mn^{+2}$ ions/ml | 840 ms | 300 ms |
| $S_2$ | $1.15 \times 10^{17}$ $Mn^{+2}$ ions/ml | 440 ms | 120 ms |
| $S_3$ | $2.30 \times 10^{17}$ $Mn^{+2}$ ions/ml | 250 ms | 60 ms |
| $S_4$ | $4.37 \times 10^{17}$ $Mn^{+2}$ ions/ml | 150 ms | 30 ms |

The tissue types revealed by the $T_1$, $T_2$ and proton density values in display 13 are determined by processing 15 from look-up tables, and tissue densities are assigned within the image-contour boundaries in display 16. The images of display 16 are furthermore corrected empirically for geometry distortion in accordance with data supplied from memory 17. The data stored in memory 17 is derived using a set of drum phantoms of the spider-web form, and correction for geometry distortion is realistically effective principally because of the accuracy and spatial resolution with which image-contours are defined.

The tissue types assigned to the corrected images are utilised in display 16 through the Bulk Heterogeneity Correction method described by Richard A, Geise et al, Radiology, 124:133–141, July, 1977, to establish for each image a normalised tissue density value; the up-datable look-up table for this is stored in memory 18. Accordingly, the display 16 when used at step 19 in conjunction with the positional datums derived from the couch 14, has all the tissue contours accurately mapped out with their respective tissue densities and locations. This establishes an accurate and readily-usable, stand-alone alone basis for diagnosis and treatment planning, and enables a true three-dimensional assessment and plan to be made when both orthogonal and oblique MR images are involved.

Although the method and system of the invention have been described above in the medical context they are applicable more widely than this, for example, in engineering, in physical science and in the field of instrumentation generally. Moreover, the method and system is not limited to MR imaging, but may be utilised where other forms of imaging are involved. The steps and structure represented in FIG. 1 by 'boxes' 1 to 11 are just as applicable to computer assisted tomography (CT), as they are to MR imaging. Other forms of imaging to which the invention is applicable include X-ray radiography, film- or print-image transformation to digital form, digital X-ray fluorography, ultra-sound imaging, nuclear medicine, positron emission tomography (PET) and other camera or imaging. The technique is particularly suitable for use in X-ray digital fluorography, in which small structures under study are highlighted by injection of contrast liquids; the small structures may also be isolated from surrounding interfering effects by using an image subtraction technique.

The inherent resolutions of X-ray radiography, ultra-sound imaging, nuclear medicine, and PET scanning are relatively low, and some are used for real-time study. Only the individual still frame or hard-copy images may be re-processed.

In the context of engineering, physical science and the field of instrumentation, the invention is applicable to one-dimensional imaging as used, for example, in regard to bar-code patterns, the spectrum of DNA analysis, iris patterns of eyes (for example, for identification purposes in commercial banking), finger-print identification, and emission spectroscopy. The invention is also applicable to two-dimensional imaging, for example, in relation to images obtained by satellite or pattern recognition, or from a surveillance camera or during laboratory experimentation. As a general matter, the invention is applicable where there needs to be accurate determination of the edge position in an image versus the true object-edge position, for the purpose, for example, of measurement of the positional displacement between object and image, distortion correction and manufacturing control.

As a further example of application of the present invention, a method and system that uses CT and MR imaging in conjunction with one another, will now be described.

The major contribution to the magnetic-resonance (MR) signal comes from the abundant protons content of water molecules and protein. It is a quantum process at the Larmor frequency according to the magnetic field in use. The '$T_1$-weighted' and '$T_2$-weighted' MR signals from protons provide contrast numbers that are relative in scale, whereas in CT, the X-ray absorption is a polychromatic attenuation process affected by the electron densities of all the atoms presented within the X-ray beam. There is no equation to correlate the CT number (or the linear attenuation coefficient, electron density, or tissue density) with the MR-contrast numbers; no direct calibration between the two types of signal is possible. This lack of correlation is confirmed by consideration of bone and air which are at opposite ends of the CT contrast (absolute) scale using water as the base-line reference, but which are at the same end of the MR-image contrast (relative) scale owing to their common low proton-population.

The lack of correlation between the CT and MR signals acts against their use in combination for imaging purposes, but the present invention provides a method and system by which the advantages of each may be utilised to improve image resolution and contrast information.

In the latter regard, CT provides a high spatial resolution but only in regard to view normal to the transverse slice. Resolution for all re-constructed non-transverse planes is poor owing to the need to use elongate voxels to improve signal-to-noise ratio. Also, the partial-volume effect of using elongate voxels may give rise to detection errors at the thin edge of a contrast profile of a lesion. MR, on the other hand, can give the same high degree of spatial resolution viewed in the normal direction to any image-slice plane, and can also provide isotropic resolution with cubic-voxel volume imaging.

To this end, multiple-slice transverse CT scans are collected across a section of the volume of interest in a patient or other subject. Corresponding multiple-slice transverse MR scans of the same volume are also collected. The slice thickness of the latter scans may be one half, or smaller, of the thickness of the CT slices, and may be collected two-dimensionally or three-dimensionally. The patient or other object scanned is constrained throughout on a couch that provides landmarks with respect to a coordinate reference arrangement on the couch-top. This is to ensure the reproducibility of, for example, anatomical positions and features to the first order accuracy for the corresponding CT and MR scans, and possibly for radiation treatment to be made.

The respective transverse planes of the CT and MR images are processed individually in the method and are matched with one another in a de-convoluted space for the CT and MR images. The two sets of de-convoluted maps are then merged together to a second order of accuracy in order that the CT numbers may be transferred over to replace the corresponding MR contrast numbers. Once this has been achieved, non-transverse (or oblique) planes can be obtained from the two-dimensional MR images, or from the re-arrangement of the corresponding voxels of the three-dimensional volume images; where two-dimensional MR is used, a further step of contrast transformation may be required.

The respective transverse planes of CT and MR images are processed individually by using 'boundary' or 'fingerprint' matching techniques in a de-convolution space for the CT & MR images. In these transverse image planes, in particular when used medically, the skin-contour features along the sides of the patient may be best used for second-order alignment and matching purposes, as they are less affected by patient-movements. Transitional error may be readily corrected with respect to the coordinate positions of a rectangular tubing system embedded in the couch-top (for example that described above with reference to FIGS. 5 and 6). The processed data may then be used for a 'diagnostic and statistics software package' of CT image versus MR image for their exactly corresponding transverse slice(s), and an associated 'statistical package' for accurate computation of the 'true' area, and then the 'true' volume, of a lesion or tissue profile or contour.

The two sets of de-convoluted maps may also be merged together to a second order of accuracy in order that the CT numbers may be transferred over to replace the corresponding MR contrast numbers. Once this has been done, non-transverse (or oblique) planes are obtained from the two-dimensional image or from the re-arrangement of the corresponding voxels of the three-dimensional volume; in the two-dimensional MR case, a further step of contrast transformation is required. The transferred contrast data may then be used in a three-dimensional radiotherapy treatment planning software package for an in-plane, oblique-image pseudo-three-dimensional approach using MR images.

Figure 7:
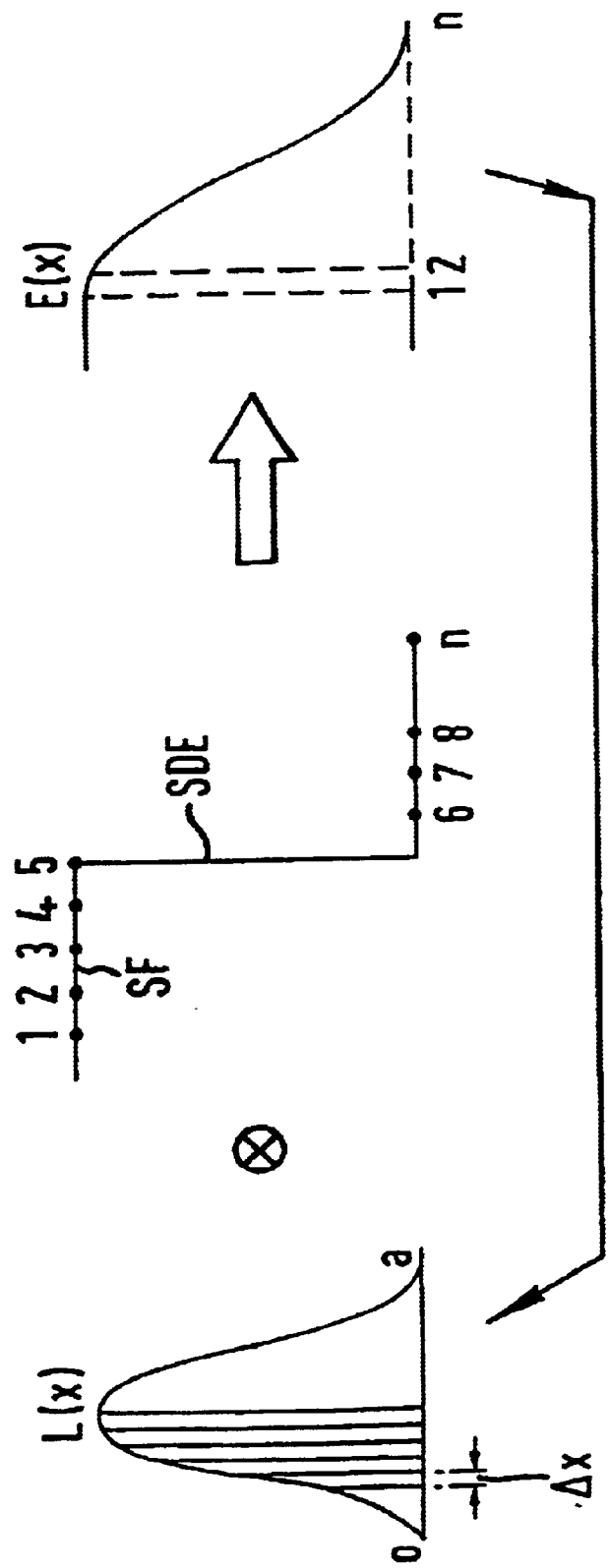
FIG. 7 provides illustrates of a convolution operation, as a basis for a mathematical model of de-convolution processing in accordance with the method and system of FIG. 1

Software required for de-convolution processing of image data according to the invention may be implemented in conjunction with a least-squares curve-fitting method. A mathematical model of the method, from which the required software can be readily developed, will now be given in relation to FIG. 7 which indicates the convolution of an LSF $L(x)$ with a step function SF having a step-down edge SDE, to produce an image ERF $E(x)$. Considering the values of $E(x)$ resulting from the convolution at points $x=1$ to $x=n$ of SF:

at $x = 1$: $\sum_{0}^{a} L(x)\Delta x = E(x)_1$ at $x = 2$: $\sum_{0}^{a} L(x)\Delta x - \sum_{a-1}^{a} L(x)\Delta x = E(x)_2$ at $x = 3$: $\sum_{0}^{a} L(x)\Delta x - \sum_{a-2}^{a} L(x)\Delta x = E(x)_3$ until at $x = n$: $\sum_{0}^{a} L(x)\Delta x - \sum_{1}^{a} L(x)\Delta x = E(x)_n$ For de-convolution, that is to say, for the ERF $E(x)$ to manifest the LSF $L(x)$:

$$E(x)_1 - E(x)_2 = \sum_{a-1}^{a} L(x)\Delta x = L(x)_{(a-1)-a}\Delta x$$

$$\{E(x)_1 - E(x)_2\}/\Delta x = L(x)_{(a-1)-a}$$

thus:

$$\{E(x)_2 - E(x)_3\}/\Delta x = L(x)_{(a-2)-(a-1)}$$

leading to $$\{E(x)_{(n-1)} - E(x)_n\}/\Delta x = L(x)_{(n-1)-n}$$

Thus, the same shape of LSF is recovered by the de-convolution process independently of the sense of-the ERF; it does not matter whether a roll-up or a roll-down ERF of a positive or a negative contrast profile, is involved. This is an important property as a positive contrast contour will have roll-up (from low to high) ERFs at both ends whereas a negative contrast contour will have roll-down (from high to low) ERFs at both ends.

In the practical implementation, the LSF is derived from the ERF by de-convolution using a running filter. This enhances the accuracy of the method in overcoming the problem of noise that affects the digitised pixel values of the image. Use is made of a least-squares fitting of a set of data points that advances along the whole length of the function from one point to another.

Assuming that $y = a_0 + a_1 x + a_2 x^2$ represents the ERF curve a five-point or seven-point fit is used, and the normal equation becomes:

$$\begin{vmatrix} \Sigma_1 & \Sigma x_i & \Sigma x_i^2 \\ \Sigma x_i & \Sigma x_i^2 & \Sigma x_i^3 \\ \Sigma x_i^2 & \Sigma x_i^3 & \Sigma x_i^4 \end{vmatrix} \begin{vmatrix} a0 \\ a1 \\ a2 \end{vmatrix} = \begin{vmatrix} \Sigma y_i \\ \Sigma x_i y_i \\ \Sigma x_i^2 y_i \end{vmatrix}$$

where: i is 1+n, ... 5+n; ... until m−5, ... m or
i is 1+n, ... 7+n; ... until m−7, ... m n is 0,1, 2, ... ; and
1, ... m is the span of the ERF profile.

The solution may be derived from either:

$$\begin{vmatrix} a0 \\ a1 \\ a2 \end{vmatrix} = \begin{vmatrix} \Sigma_1 & \Sigma x & \Sigma x^2 \\ \Sigma x & \Sigma x^2 & \Sigma x^3 \\ \Sigma x^2 & \Sigma x^3 & \Sigma x^4 \end{vmatrix}^{-1} \begin{vmatrix} \Sigma y \\ \Sigma xy \\ \Sigma x^2 y \end{vmatrix} \text{ or:}$$

$$\frac{a0}{\begin{vmatrix} \Sigma y & \Sigma x & \Sigma x^2 \\ \Sigma xy & \Sigma x^2 & \Sigma x^3 \\ \Sigma x^2 y & \Sigma x^3 & \Sigma x^4 \end{vmatrix}} =$$

$$\frac{a1}{\begin{vmatrix} \Sigma_1 & \Sigma x & \Sigma x^2 \\ \Sigma x & \Sigma xy & \Sigma x^3 \\ \Sigma x^2 & \Sigma x^2 y & \Sigma x^4 \end{vmatrix}} = \frac{a2}{\begin{vmatrix} \Sigma_1 & \Sigma x & \Sigma y \\ \Sigma x & \Sigma x^2 & \Sigma xy \\ \Sigma x^2 & \Sigma x^3 & \Sigma x^2 y \end{vmatrix}} = \frac{1}{\begin{vmatrix} \Sigma_1 & \Sigma x & \Sigma x^2 \\ \Sigma x & \Sigma x^2 & \Sigma x^3 \\ \Sigma x^2 & \Sigma x^3 & \Sigma x^4 \end{vmatrix}}$$

For both of these equations to be valid:

$$\begin{vmatrix} \Sigma_1 & \Sigma x & \Sigma x^2 \\ \Sigma x & \Sigma x^2 & \Sigma x^3 \\ \Sigma x^2 & \Sigma x^3 & \Sigma x^4 \end{vmatrix} \neq 0$$

The gradient at $dy/dx_{(3+n)}$ or $dy/dx_{(4+n)}$ can then be derived and plotted against x for the LSF profile.

The graph of dy/dx against x gives the LSF profile. The peak of this profile is located centrally of the mid-points of the ascending and descending limbs of the graph. These points define the extremes of the full-width-half-maximum (FWHM) of the profile and the mid-point of this is determined with an accuracy of sub-pixel level owing to the 'average' effect.

The point spread function (PSF) is the two dimensional profile which may be derived, in practice, from the two corresponding LSFs orthogonal to one another within an image plane. The peak position of the PSF profile is, therefore, from the 'mean' or 'cross-over' of the two peaks or the two LSF profiles. The PSF is obtained in practice from two orthogonal axes in a two-dimensional plane.

The generation of the LSF (or PSF) is, after phase-reversal correction, independent of the roll-up or roll-down nature of ERFs at the edges of the contrast contour. In other words, it is independent of the sense and the absolute value of the contrast numbers within the contour. The peak position of the LSF (or PSF) is the central half-way (50%) point of the roll-up or roll-down ERF which is the optimum position for true-edge definition

What is claimed is:

1. An imaging method for enhancing spatial resolution within an image domain of an image edge-response function of a scanned object-discontinuity, the method comprising the steps of:
   carrying out a de-convolution process on the image edge-response function to derive from the image edge-response function a spread profile of the respective point-spread function or line-spread function of the image edge-response function, the de-convolution process being carried out with sub-pixel sampling of the image-edge response function;
   correlating the spread profile with a profile of the image edge-response function;
   identifying within the image domain the location of the object-discontinuity, the location of the object-discontinuity being identified within the image domain by a mid-point of a full-width half-maximum of the spread profile; and
   redistributing sub-pixels of the profile of the edge-response function to enhance the spatial resolution of the object-discontinuity within the image domain, the sub-pixels being redistributed between two opposite sides of the identified location of the object-discontinuity in the image domain, by transferring sub-pixels on one of the two sides to the other of the two side of the identified location.

2. The method according to claim 1, further comprising the step of using low-contrast filtering to remove spurious edges of the image of the object-discontinuity in the image domain.

3. The method according to claim 1, wherein the object-discontinuity is one of a multiplicity of object-discontinuities of a scanned object, and the method further comprises the step of enhancing the spatial resolution in the image domain of the image edge-response function of each of the object-discontinuities to define an edge-contour of the object within the image domain.

4. The method according to claim 3, further comprising the step of determining the intensity within the edge-contour of the object within the image domain.

5. The method according to claim 1, further comprising the step of carrying out the de-convolution process using least-squares running filtering.

6. The method according to claim 3, further comprising the step of determining the area of the object-image within the edge-contour.

7. The method according to claim 3, further comprising the step of determining the volume of the object-image within the edge-contour.

8. The method according to claim 3, further comprising the step of scanning the scanned object via a magnetic resonance (MR) scan, values of relaxation times $T_1$ and $T_2$ are derived for the image of the object within said contour, and these values are used to identify from stored data, types of material involved in the scanned object.

9. The method according to claim 8, further comprising the step of deriving density values for the identified types of material from further stored data.

10. The method according to claim 1, further comprising the step of deriving corresponding computed tomography (CT) and magnetic resonance (MR) scans of the same part of an object, the scans are related to one another for correlation of one to the other positionally with respect to said part using the de-convolution process, and imaging of said part of the object is provided in accordance with the MR-scan image as modified spatially in dependence upon the CT contrast numbers applicable to the corresponding, correlated positions of the CT scan.

11. The method according to claim 10, further comprising the step of applying geometric correction to the imaging of said part in accordance with stored data.

12. An imaging system for enhancing spatial resolution within an image domain of an image edge-response function of a scanned object-discontinuity, the system comprising:
   means for carrying out a de-convolution process on the image edge-response function to derive from the image edge-response function a spread profile of the respective point-spread function or a line-spread function of the image edge-response function, the de-convolution process being carried out with sub-pixel sampling of the image-edge response function;
   means for correlating the spread profile with a profile of the image edge-response function;
   means for identifying within the image domain the location of the object-discontinuity, the location of the object-discontinuity being identified within the image domain by a mid-point of a full-width half-maximum of the spread profile; and
   means for redistributing sub-pixels of the profile of the edge-response function to enhance the spatial resolution of the object-discontinuity within the image domain, the sub-pixels being redistributed between two opposite sides of the identified location of the object-discontinuity in the image domain, by transferring sub-pixels on one of the two sides to the other of the two side of the identified location.

13. The imaging system according to claim 12, wherein the means for carrying out the de-convolution process is a least-squares running filter.

14. A method of imaging in which a de-convolution process is applied to image-domain results of an object-scan to derive therefrom a respective point-spread function or a line-spread function of at least one object-discontinuity, and to derive from said function a location in the image domain of the respective discontinuity;

the method comprising the step of:

carrying out the de-convolution process out using sub-pixel sampling; and correlating the function with the image-domain results of the object-scan for enhancement of spatial resolution of the imaging of the respective discontinuity, and the enhancement of spatial resolution of the imaging of the respective discontinuity involves transfer of subpixels within the image-domain results of the respective discontinuity, the sub-pixels being transferred within their respective image-domain results from one side to the other of the location for edge-image definition.

15. The method according to claim 14, further comprises the steps of enhancing the spatial resolution of the image-edge response functions that result respectively from a magnetic resonance (MR) scan and a computed tomography (CT) scan of the object-discontinuity, correlating the enhanced image-edge response functions of the MR and CT scans with one another, deriving from the enhanced image-edge response function of the CT scan, CT contrast numbers for respective parts of the object-discontinuity, and providing modified imaging of the parts of the object-discontinuity, the modified imaging being provided from the respective parts of the MR scan modified by the CT contrast numbers for those respective parts.

16. An imaging system comprising means for performing a de-convolution process on image-domain results of an object-scan to derive therefrom a respective point-spread function or a line-spread function of at least one object-discontinuity, and a mechanism to derive from the function a location in the image domain of the respective discontinuity;

wherein the de-convolution process is carried out using sub-pixel sampling; and the function is correlated with the image-domain results of the object-scan for enhancement of spatial resolution of the imaging of the respective discontinuity, the enhancement of spatial resolution of the imaging of the respective discontinuity involves transfer of sub-pixels within the image-domain results of the respective discontinuity, the sub-pixels being transferred within their respective image-domain results from one side to the other of the location for edge-image definition.

\* \* \* \* \*